United States Patent
Muny

(10) Patent No.: US 6,783,324 B2
(45) Date of Patent: Aug. 31, 2004

(54) COMPRESSOR BLEED CASE

(75) Inventor: Richard Martin Muny, Union, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/219,961

(22) Filed: Aug. 15, 2002

(65) Prior Publication Data

US 2004/0033133 A1 Feb. 19, 2004

(51) Int. Cl.$^7$ .............................................. F01D 25/12
(52) U.S. Cl. ................ 415/144; 415/173.1; 415/173.4; 415/116; 60/782; 60/785
(58) Field of Search ................................ 415/144, 145, 415/115, 116, 169.1, 173.1, 173.2, 173.4, 173.5; 60/782, 785

(56) References Cited

U.S. PATENT DOCUMENTS

| | | | |
|---|---|---|---|
| 3,142,438 A | * | 7/1964 | McKenzie .................. 415/190 |
| 3,966,354 A | * | 6/1976 | Patterson .................... 415/116 |
| 4,101,242 A | | 7/1978 | Coplin et al. |
| 4,536,127 A | * | 8/1985 | Rossmann et al. ........ 415/173.4 |
| 4,844,689 A | | 7/1989 | Seed |
| 5,059,093 A | | 10/1991 | Khalid et al. |
| 5,118,253 A | | 6/1992 | Balkcum, III |
| 5,203,162 A | | 4/1993 | Burge |
| 5,209,633 A | | 5/1993 | McGreehan et al. |
| 5,327,716 A | | 7/1994 | Giffin, III et al. |
| 5,351,478 A | | 10/1994 | Walker et al. |
| 5,593,277 A | * | 1/1997 | Proctor et al. ............ 415/173.1 |
| 6,109,868 A | | 8/2000 | Bulman et al. |
| 6,302,642 B1 | * | 10/2001 | Nagler et al. ................ 415/116 |
| 6,325,595 B1 | | 12/2001 | Breeze-Stringfellow et al. |

FOREIGN PATENT DOCUMENTS

| | | | | |
|---|---|---|---|---|
| BE | 551816 A | * | 4/1957 | .................. 415/116 |
| JP | 62-153504 A | * | 7/1987 | ............... 415/173.1 |

* cited by examiner

Primary Examiner—Christopher Verdier
(74) Attorney, Agent, or Firm—William Scott Andes; Pierce Atwood

(57) ABSTRACT

A bleed case assembly is provided comprising an annular outer case and an inner case. The inner case comprises an annular shroud portion having a radially outer surface opposite a radially inner surface, and a generally planar flange extending radially outwardly from the radially outer surface. The flange includes a circumferential array of bleed openings formed therethrough. The flange is attached to the outer case so as to reduce the thermal response of the inner case.

14 Claims, 3 Drawing Sheets

COMPRESSOR BLEED CASE

The U.S. Government may have certain rights in this invention pursuant to contract number N00019-96-C-0176 awarded by the Department of the Navy.

BACKGROUND OF THE INVENTION

This invention relates generally to case structures for turbomachinery and more particularly to cases which include bleed flow provisions.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. The compressor typically includes multiple stages, each of which comprises a row of stationary stator vanes and an adjacent row of compressor blades attached to a rotor. A portion of compressed air from one or more stages may be extracted for turbine section cooling, airframe pressurization, anti-icing, or other uses.

A case assembly comprising inner and outer cases surrounds the compressor rotor. To extract large volumes of bleed air, an annular bleed slot is defined between the outer case and the inner case. The inner case is less massive than the rotor and is bathed in compressed, heated air. Accordingly, the inner case has a rapid thermal response, that is, it expands or contracts more rapidly than the rotor as the temperature of the air flow changes. This results in phenomena known as thrust droops and rubs, which cause loss of efficiency and possible engine damage. Prior art solutions have attempted to tie the inner and outer cases together to provide better support of the inner case. However, the prior art designs include cantilevered shroud sections that allow undesired radial movement in the portions of the inner case surrounding one or more blade stages.

Accordingly, there is a need for a compressor bleed case having a reduced thermal response.

BRIEF SUMMARY OF THE INVENTION

The above-mentioned need is met by the present invention, which provides a bleed case assembly comprising an annular outer case and an inner case. The inner case comprises an annular shroud portion having a radially outer surface opposite a radially inner surface, and a generally planar flange extending radially outwardly from the radially outer surface. The flange includes a circumferential array of bleed openings formed therethrough. The flange is attached to the outer case so as to reduce the thermal response of the inner case.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
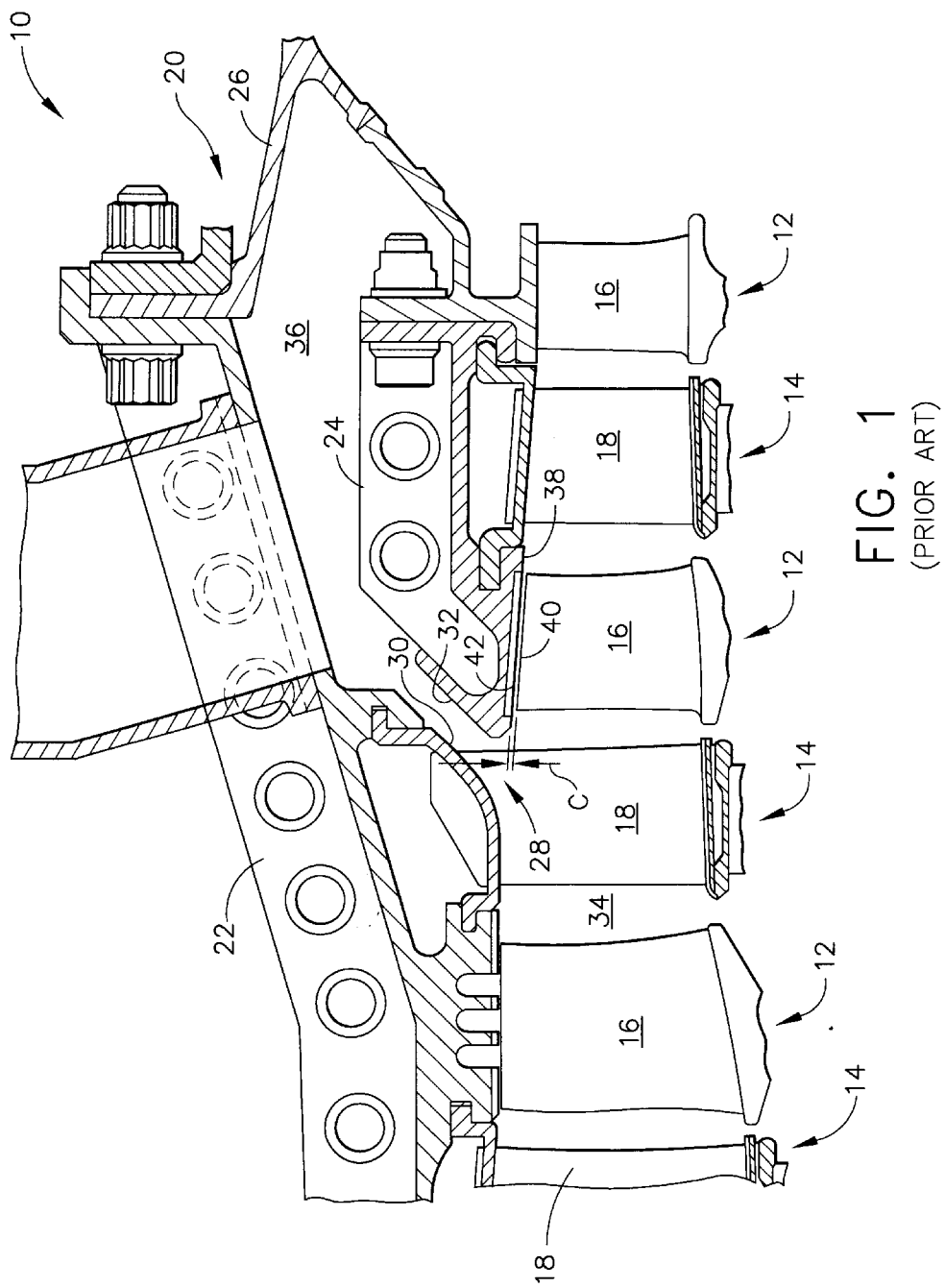
FIG. 1 is a schematic partial cross-section of a prior art compressor assembly.

Referring to the drawings wherein identical reference numerals denote the same elements throughout the various views, FIG. 1 shows a prior art compressor assembly 10. The compressor assembly 10 includes a number of axially alternating rotor and stator stages 12 and 14. Each rotor stage 12 comprises a circumferential array of compressor blades 16 attached to a rotating disk or spool (not shown). Each stator stage 14 comprises a circumferential array of stationary stator vanes 18 which are attached to a case assembly 20.

The case assembly 20 surrounds the rotor stages 12 of the compressor assembly 10. The case assembly 20 includes an annular outer case 22 and an annular inner case 24 which are connected together by an annular, radially extending portion 26. An annular bleed slot 28 is defined between a rearward-facing wall 30 of the outer case 22 and a forward-facing wall 32 of the inner case 24. The bleed slot 28 serves to receive a portion of the compressed air flow from the working gas flowpath 34 and channel it to a plenum 36. The inner case 24 has a radially inner flowpath surface 38 which forms the outer boundary of the working gas flowpath 34 and provides a sealing surface for the tips 40 of the compressor blades 16. For efficient operation the case assembly 20 is designed in a known manner to create uniformly small radial clearance, denoted C in FIG. 1, between the tips 40 of the compressor blades 16 and the flowpath surface 38 of the inner case 24. The relative size of the radial clearance C is exaggerated for illustration purposes.

In this prior art design, the portion of the inner case 24 that is directly aft of the bleed slot 28 is supported in a cantilevered fashion from the radially extending portion 26 of the case assembly 20. When the temperature of the air flow suddenly increases during engine operation, for example in response to a rapid movement of the engine power lever to a high power setting, the inner case 24 expands more rapidly than the rotor 12, increasing the radial clearance C between the flowpath surface 38 and the tips 40 of the compressor blades 16. This allows backflow of higher-pressure air from downstream of the compressor blades 16, decreasing efficiency and stall margin of the compressor 10.

Conversely, when the temperature of the air flow suddenly decreases, for example in response to a rapid movement of the engine power lever to a low power setting, the inner case 24 contracts more rapidly than the rotor 12. This decreases the radial clearance C between the flowpath surface 38 and the tips 40 of the compressor blades 16, and may result in contact between the two, known as a "rub", which can damage the components or excessively wear away any abradable material 42 that may be disposed on the flowpath surface 38. This leads to an increase in the radial clearance C beyond its intended dimension.

Figure 2:
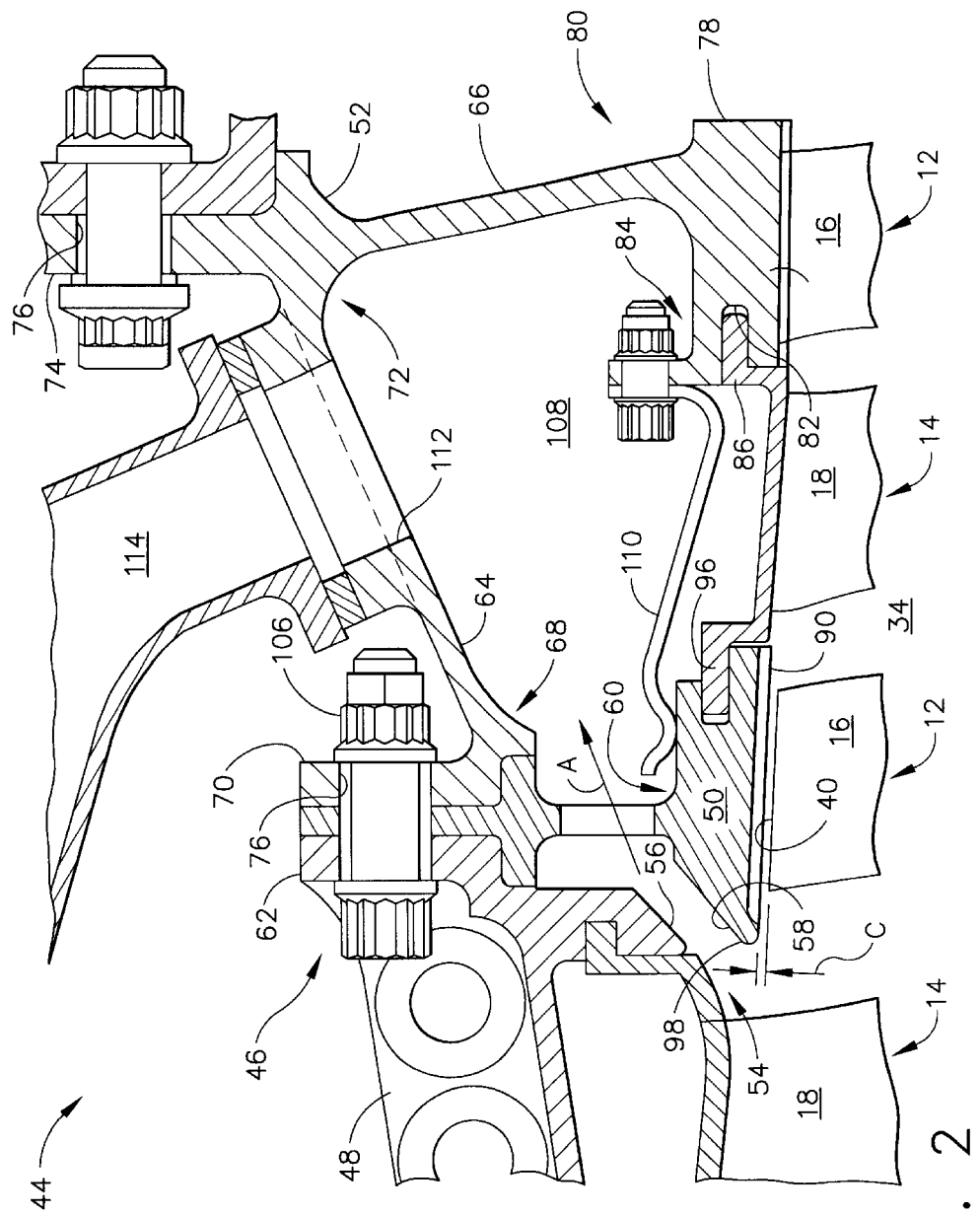
FIG. 2 is a schematic partial cross-section of a compressor assembly constructed in accordance with the present invention.

FIG. 2 illustrates a compressor assembly 44 that incorporates an exemplary compressor bleed case assembly 46 constructed in accordance with the present invention. The basic components of the bleed case assembly 46 are an outer case 48, an inner case 50, and an aft case 52. The inner case 50 is axially spaced away from the outer case 48 so that an annular bleed slot 54 is defined between an aft wall 56 of the outer case 48 and a forward wall 58 of a first shroud portion 60 of the inner case 50. The outer case 48 is an annular structure, similar to the prior art outer case 22, that surrounds a portion of the compressor stages 12 and forms an attachment point for a plurality of stages 14 of stator vanes 18. The outer case 48 differs from the prior art outer case 22 in that is it shorter in the axial direction, having an aft flange 62 that is approximately aligned with the axial position of the bleed slot 54.

The aft case 52 is an annular component having an axially extending arm 64 and a radially extending arm 66 which are joined to form a generally L-shaped cross section. The forward end 68 of the axially extending arm 64 has a first radially extending flange 70 attached thereto, and the aft end 72 of the axially extending arm 64 has a second radially extending flange 74 attached thereto. Each of the flanges 70 and 74 includes a plurality of bolt holes 76. An annular, axially extending second shroud portion 78 is disposed at the radially inner end 80 of the radially extending arm 66. A circumferential mounting groove 82 or other similar structure may be formed in the forward end 84 of the second shroud portion 78 for receiving a mounting rail 86 of an adjacent stator vane 18.

Figure 4:
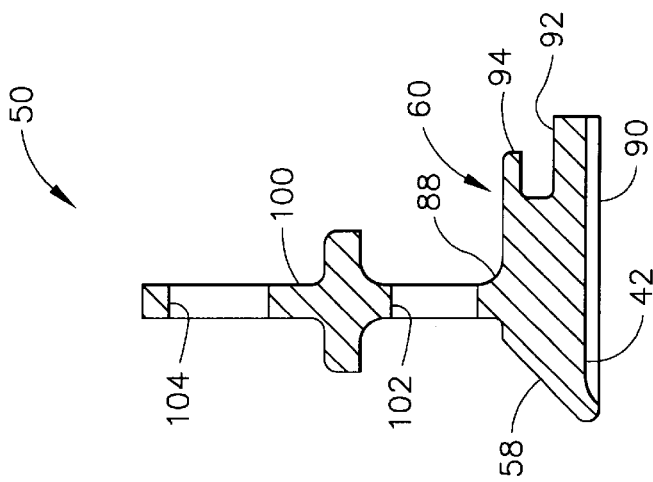
FIG. 4 is a view taken along lines 4—4 of the inner case of FIG. 3.
Figure 3:
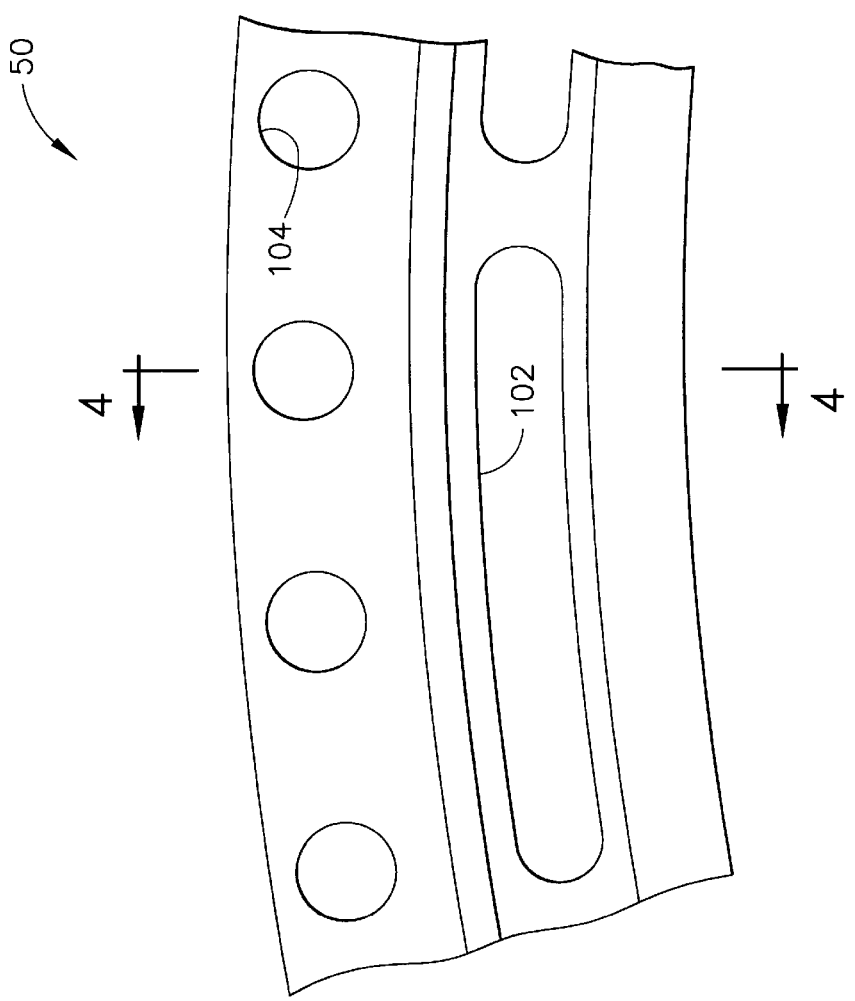
FIG. 3 is a front view of an inner case for use with the compressor assembly of the present invention.

FIGS. 3 and 4 illustrate the inner case 50 in more detail. The inner case 50 is an annular component which includes a generally cylindrical first shroud portion 60 having a radially facing outer surface 88 opposite a radially facing inner surface 90. In the illustrated example the inner case 50 is a continuous circular ring, a small segment of which is shown in FIG. 3. However, the inner case 50 could also comprise a plurality of arcuate segments. The inner surface 90 of the first shroud portion 50 forms a portion of the outer boundary of the working gas flowpath 34 and provides a sealing surface for the tips 40 of the compressor blades 16. A known type of abradable material 42 may be disposed on the inner surface 90. A circumferential mounting groove 92 or other similar structure may be formed in the aft end 94 of the first shroud portion 60 for receiving a mounting rail 96 of an adjacent stator vane 18 (see FIG. 2). A forward wall 58 connects the inner surface 90 and the outer surface 88. The forward wall 58 is disposed at an acute angle to the inner surface 90 so as to define a flow scoop 98.

A generally planar flange 100 extends radially outwardly from the outer surface 88 at a location aft of the forward wall 58. A circumferential array of bleed openings 102 are formed through the flange 100 radially adjacent the first shroud portion 60. A circumferential array of mounting holes 104 are formed through the flange 100 radially outward of the bleed openings 102.

Referring again to FIG. 2, the bleed case assembly 46 is assembled by placing the flange 100 of the inner case 50 between the aft flange 62 of the outer case 48 and the first flange 70 of the aft case 52. The three flanges are secured together with a plurality of fasteners 106 such as the illustrated bolts. The flange 100 of the inner case 60 is aligned with the axial position of the blade row immediately aft of the bleed slot 54. By "aligned with the axial position of the blade row" it is meant that the axial position of flange 100 falls between the forward and aft edges of the blades 16. The flange 100 need not be directly aligned with any particular location along the axial extent of the blades 16, so long as it is placed so that any radial expansion or contraction of the first shroud portion 60 will be transmitted to the flange 100 substantially in direct tension or compression. When assembled, the outer, inner and aft cases, along with a row of stator vanes 18, cooperate to define an annular plenum 108. An annular seal 110 may be disposed around the stator vane row 14 to prevent leakage between the working gas flowpath 34 and the plenum 108. One or more ports 112 are formed in the axial arm 64 of the aft case 52. A bleed air manifold 114 may be connected to the ports 112 to receive the bleed air flow from the plenum 114 and duct it to the needed location.

In operation, compressed, heated air flows through the working gas flowpath 34. A portion of the flow is diverted into the bleed slot 54, the bleed openings 102, and into the plenum 108, as shown by the arrows labeled A in FIG. 2. When the temperature of the air flow suddenly increases or decreases, for example in response to rapid movements of the engine power lever to a high or low position, the inner case 50 tends to expand or contract faster than the rotor 12, increasing or decreasing the radial clearance C between the inner surface 90 and the tips 40 of the compressor blades 16, as described above with respect to the prior art compressor case. However, in the present invention, the inner case 50 is mechanically tied to the relative more massive and stable outer case 48 by the flange 100 that extends directly radially outboard of the shroud portion 60. This structural arrangement greatly reduces the amount of radial movement of the inner case 50. Because the flange 100 is directly loaded in tension or compression, there is little or no flexing of the shroud portion 60 that would be associated with a cantilevered support. This reduced thermal response decreases the variation of the radial clearance C in changing operating conditions, which improves the efficiency of the compressor and allows closer design tolerances to be implemented.

The foregoing has described a bleed case assembly comprising an annular outer case and an inner case. The inner case comprises an annular shroud portion having a radially outer surface opposite a radially inner surface, and a generally planar flange extending radially outwardly from the radially outer surface. The flange includes a circumferential array of bleed openings formed therethrough. The flange is attached to the outer case so as to reduce the thermal response of the inner case. While specific embodiments of the present invention have been described, it will be apparent to those skilled in the art that various modifications thereto can be made without departing from the spirit and scope of the invention as defined in the appended claims.

What is claimed is:

1. A bleed case assembly, comprising:
    an annular outer case having an aft wall; and
    an inner case comprising:
        an annular shroud portion having a radially facing outer surface opposite a radially facing inner surface and a forward wall extending between said inner surface and said outer surface; and
        a flange extending radially outwardly from said outer surface at a location aft of said forward wall, said flange including a circumferential array of bleed openings formed therethrough;
    wherein said flange is attached to said outer case so that an annular bleed slot is defined by said forward wall and said aft wall.

2. The bleed case assembly of claim 1, wherein said flange of said inner case includes a circumferential array of mounting holes formed therethrough, radially outward of said bleed openings.

3. The bleed case assembly of claim 1 further comprising an abradable material disposed on said inner surface of said shroud portion.

4. The bleed case assembly of claim 1 further comprising a circumferential groove formed in an aft end of said shroud portion.

5. The bleed case assembly of claim 1 wherein said forward wall is disposed at an acute angle to said inner surface.

6. A case for a gas turbine engine, comprising:
- an annular shroud portion having a radially facing outer surface opposite a radially facing inner surface and a forward wall extending between said inner surface and said outer surface, said forward wall being disposed at an acute angle to said inner surface; and
- a flange extending radially outwardly from said outer surface at a location aft of said forward wall, said flange including:
    - a circumferential array of bleed openings formed therethrough, radially adjacent said shroud portion, and
    - a circumferential array of mounting holes formed therethrough, radially outward of said bleed openings.

7. The case of claim 6 further comprising an abradable material disposed on said radially inner surface of said shroud portion.

8. The case of claim 6 further comprising a circumferential groove formed in an aft end of said shroud portion.

9. A compressor assembly comprising:
- a rotor having a plurality of radially outwardly extending blades attached thereto;
- an annular outer case having an aft wall; and
- an annular inner case including:
    - a first shroud portion surrounding said blades, said first shroud portion having a radially facing inner surface opposite a radially facing outer surface, said inner and outer surfaces being connected by a forward wall, and
    - a flange which extends radially outward from said outer surface, said flange being connected to said outer case, aligned with the axial position of said blades, and having a plurality of bleed openings formed therethrough;
- wherein said inner case is disposed in spaced-apart relationship from said outer case so that an annular bleed slot is defined between said aft wall of said outer case and said forward wall of said first shroud portion of said inner case.

10. The compressor assembly of claim 9 further comprising:
- a stator row comprising a plurality of radially inwardly extending stator vanes, each of said vanes including an annular band having forward and aft ends; and
- an annular aft case including an axially forward extending arm connected to a radially inwardly extending arm, said radially inwardly extending arm including an annular second shroud portion;
- wherein said stator row is disposed between said first shroud portion of said inner case and said second shroud portion of said aft case.

11. The compressor assembly of claim 10 wherein each of said annular bands includes:
- a forward rail disposed at said forward end of said annular band, said forward rail being received in a circumferential groove formed in said first shroud portion; and
- an aft rail disposed at said aft end of said annular band, said aft rail being received in a circumferential groove formed in said second shroud portion.

12. The compressor assembly of claim 11 further comprising an annular seal disposed around said stator row.

13. The compressor assembly of claim 9 further comprising an abradable material disposed on said radially inner surface of said first shroud portion.

14. The compressor assembly of claim 9 wherein said forward wall is disposed at an acute angle to said inner surface.

* * * * *